Jan. 27, 1942.    L. H. BROWNE    2,270,927
ROTARY SEAL
Filed Jan. 18, 1940    2 Sheets-Sheet 1

INVENTOR.
LINDSAY H. BROWNE
BY
Van Deventer + Grier
ATTORNEYS.

Jan. 27, 1942.    L. H. BROWNE    2,270,927
ROTARY SEAL
Filed Jan. 18, 1940    2 Sheets-Sheet 2
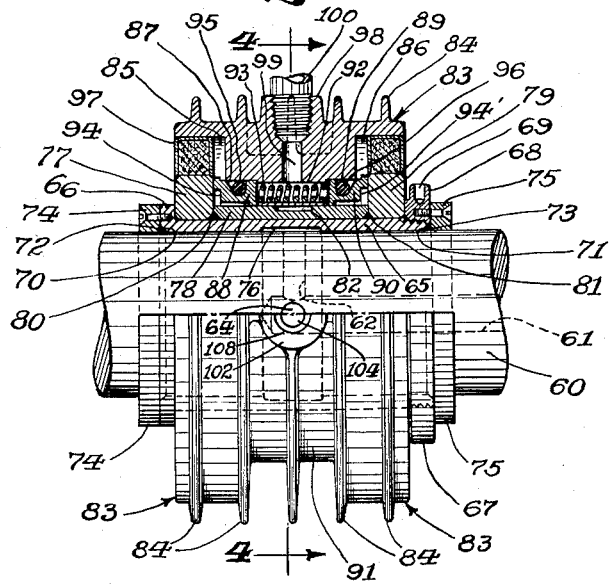
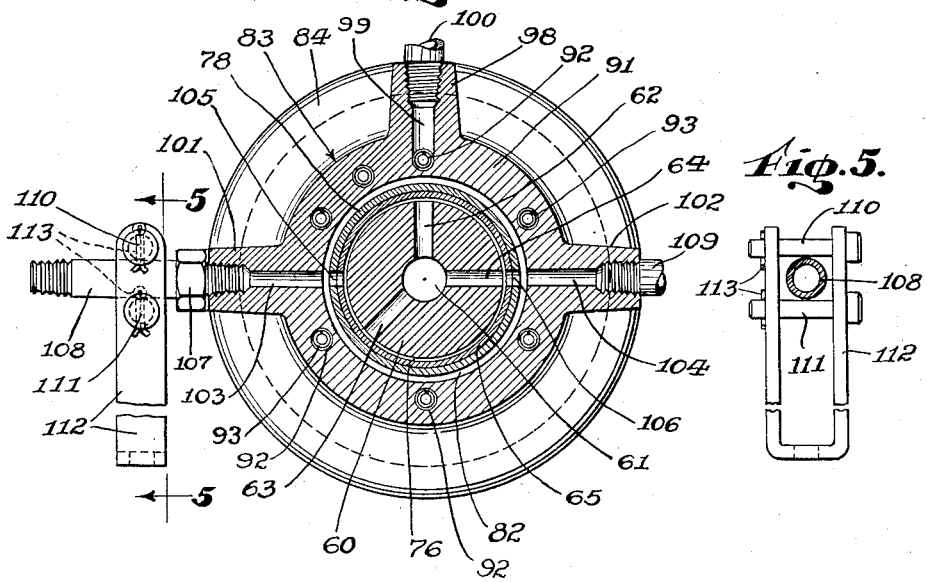
INVENTOR.
LINDSAY H. BROWNE Patented Jan. 27, 1942

2,270,927

UNITED STATES PATENT OFFICE 2,270,927

ROTARY SEAL

Lindsay H. Browne, Pittsford, N. Y., assignor to The American Brake Shoe & Foundry Company, a corporation of Delaware Application January 18, 1940, Serial No. 314,485

5 Claims. (Cl. 285—96.3)

This invention relates to improvements in rotary seals, and has for an object, the provision of rotary seals of the "straddle" type wherein fluids under pressure may be conducted to or retained in or about rotary shaft without leakage; and is a continuation in part of application Serial No. 286,750, filed July 27, 1939, Patent No. 2,230,881 of February 4, 1941.

Another object of the invention is the provision of a rotary seal including sealing members adapted to be applied to a rotative shaft, and stationary members having sealing faces in cooperative relation with the sealing faces on the rotative sealing members, said stationary sealing members being identical in form.

A further object of the invention is the provision of a rotary seal including sealing members adapted to be applied to a rotative shaft, and stationary members having sealing faces in cooperative relation with the sealing faces on the rotative sealing members, said stationary sealing members being identical in form; and the further provision of spring means initially urging said stationary sealing members into said cooperative relationship, and means to subject said stationary sealing members to a fluid medium under pressure and thereby augment the action of said spring means.

Other objects are directed toward the method of applying the rotary portion of the seal to a rotative shaft, the simplification of the lubrication of seals of this character, and the provision of a simple and effective means for sealing the parts of the rotary seal against dust, dirt, and other extraneous materials.

Further objects and advantages of the invention will be evident to those skilled in the art.

Rotary seals such as are herein described are used in cases where it is desired to control some rotating member by a fluid medium under pressure and in which the source of fluid medium is not rotatable. Such seals are usually applied to shafts carrying the device to be controlled and the shaft is provided with an interior axial hole. A radial hole is drilled into the shaft and the seal is preferably centrally lined up with this radial hole and secured in sealed relation to the shaft. A second radial hole is drilled into the shaft at some point adjacent to the member to be controlled by the fluid medium under pressure, the hole is tapped and a conduit is secured to the device to be controlled and is screwed into the tapped hole for conducting the fluid to the device, and thereby is provided a simple and leakproof system of controlling a rotating device from a stationary source of fluid supply.

In the accompanying drawings:

Figure 1 is an elevation, partly in section, showing one modification of the new and improved shaft seal as applied to a rotative shaft;

Figure 2 is a cross sectional view of the shaft seal taken along the line 2—2 of Figure 1;

Figure 3 is an elevation of a modified form of the shaft seal shown in Figure 1, said elevation being partly in section to show details of construction;

Figure 4 is a cross sectional view of the seal shown in Figure 3, as viewed along the line 4—4; and Figure 5 is an elevation taken along the line 5—5 of Figure 4, and showing details of an air connection to the seal shown in Figure 4.

A shaft 10 (Figure 1) carries a preferred embodiment of the improved shaft seal. A tubular member 11 fits on the shaft 10 and has formed within its bore an annular groove 12. A ring member 13 may be secured to one end of the tubular member 11 by means of countersunk fillister head cap screws, one of which is designated by the numeral 14. The ring member has an annular groove 15 formed in one face thereof adjacent to the left end of the tubular member 11 and the sealing face 16.

The opposite end of the tubular member has secured thereto, by countersunk fillister head cap screws 17, a ring member 18 which is identical with the ring member 13, it being provided with a sealing face 19, and an annular groove 20 adjacent thereto.

An annular ring 21 has its inner corner 22 beveled to cooperate with a sealing gasket 23 which may be formed of a ring of rubber, or the like, so as to establish a seal between the ring member 13 and the shaft 10 when the ring 21 is firmly secured to the ring member 13 by the screws 24. An annular ring 25 is identical with the ring 21, and has a beveled inner corner 26 which accommodates a sealing gasket 27 and effects a seal between the ring member 18 and the shaft 10 when the screws 28 are tightened up. The outer corners of the ring members 13 and 18, and the outer corners of the annular rings 21 and 25 are preferably beveled.

All of the above parts are secured together as described and mounted in the same relation to the shaft, form in effect an integral part of the shaft and rotate with the shaft.

*The stationary portion of the rotary seal*

A sealing ring 29 has a portion 30 of its face undercut, leaving a sealing face in contact with the sealing face 16 of the ring 13. A second sealing ring 31 has a portion 32 of its face undercut, leaving a sealing face in contact with the sealing face 19 of the ring 18. In other words, the rings 29 and 31 are identical in form, oppositely disposed and spaced apart from each other.

A tubular body 33 has a counterbore 34 formed in one end thereof and a counterbore 35 formed in the other end thereof. It is also provided with a counterbore 36, the surface of which forms a working fit with the ring 31. The counterbore 36 forms a step with the counterbore 34. Stepped with the counterbore 35 is a counterbore 37 which is of the same diameter as the counterbore 36 and the ring 29 forms a working fit with the counterbore 37.

The portion 38 of the body between the counterbores 36 and 37 has a hole formed therein which forms a working fit on the tubular member 11. A plurality of holes 39 are drilled in the portion 38. In the present embodiment, there are six holes 39, as may be seen in Figure 2.

Referring back to Figure 1, spring means 40 mounted in the hole 39 is provided for urging the rings 29 and 31 in opposite directions to maintain the sealing end portions of the rings in sealing contact with the sealing surfaces 16 and 19.

A pin 41 is preferably mounted concentric with the hole 39 and extends into holes formed in the rings 29 and 31 as shown. There are six springs 40, each having a pin 41 extending therethrough in the manner described so as to exert an even pressure distributed about the rings 29 and 31.

An annular member of U-shaped cross section designated by the numeral 42 has its open face presented to the outer face of the ring member 18 and is filled with suitable fibrous material 43 to form a dust-seal against the surface of the ring 18. The member 42 is of such diameter that it may be pressed into the undercut portion 34 of the body 33. The fibrous material 43 may be impregnated with oil. A like annular member 42a is mounted in the counterbore 35 for effecting a dust-seal with ring 13.

A hollow passage 44 is formed within the tubular body and comprises a water jacket for cooling the sealing member. A threaded hole 45 is provided at the bottom of the body 33 for an inlet connection to a cooling medium. A tapped hole 46 near the top of the body is the outlet for the cooling medium, and a suitable conduit connected thereto.

In order to effect a seal between the rings 29, 31 and the tubular body 33, the ring 29 has an annular groove 47 of generally triangular form and mounted within the groove 47 is a ring 48. This ring is preferably of round cross section, and may be made of any material such as rubber or the like for effecting a seal between the ring 29 and the body 33.

The air pressure within the body acts against the rubber ring 48 and tends to force it toward the apex of the triangle and thereby establishes an intimate seal between the ring 29 and the body 33. The ring 31 is identical with the ring 29, it being provided with a triangular groove 49 and a rubber ring 50.

The shaft 10 may have a central hole 51 formed therein parallel to its axis. A cross hole 52 is formed in the shaft radially and its inner end communicates with the hole 51. The outer end of the hole 52 communicates with the groove 12 formed within the tubular member 11. Further along on the shaft (at a point not shown) may be formed a second radial hole similar to the hole 52, and its outer end may be threaded to accommodate suitable fittings for leading the fluid medium (air for example) to a member carried on the rotating shaft and adapted to be controlled from a stationary source.

A radial hole 53 extends through the body 33 and is provided with threads 54 extending in from the outer face of the body so that a suitable connection 55 may be made for leading the fluid under pressure.

A cross hole 56, formed in the tubular member 11, forms a passage between the annular groove 12 and the space 57 between the tubular member 11 and the tubular body 33 whereby air or any other fluid under pressure may pass into the coupling through the hole 53, into the space 57, through the hole 56 into the annular groove 12 and thence via the radial hole 52 into the central hole 51 in the shaft, and thence to the member on the shaft to be controlled.

A hole 58 extending into the body communicates with one of the spring holes 39 in the body (in the drawings Figures 1 and 3 this is the top spring hole). The outer end of the hole 58 is threaded to accommodate a pipe fitting 59 for connection to a source of oil or other lubricant. The oil enters the hole 58 and flows into the cross hole 39 containing the spring. From the hole 39 it passes into the clearance spaces between the rings 29, 31 in the portion of the body 38 and thence via the horizontal passages between the rings 29, 31 and the outer surface of the tubular member 11 and into the undercut portions 30 and 32 from which the sealing faces of the rings acting against the sealing faces 16 and 19 may obtain their lubrication.

In applying the lubrication in this manner, it has been found that all parts of the coupling requiring lubrication are furnished with adequate lubrication instead of excessive lubrication. In operation, the conduits or connections may be depended upon to hold the tubular body 33 and the stationary parts carried thereby, stationary, or extra projections may be added to the tubular body 33 to be engaged by stationary supports.

In Figures 3 and 4, which show a modification of the coupling shown in Figures 1 and 2, it will be noted that the outer body is provided with fins for air cooling the coupling.

A shaft 60 has a central hole 61 formed therein. Three radial holes, designated by the numerals 62, 63 and 64, communicate with the hole 61.

A tubular body 65 is fitted on to the shaft 60. This tubular body has a flange 66 formed at one end thereof and the other end is threaded to accommodate a circular nut 67. The circular nut 67 may be provided with a boss 68 having a hole 69 formed therein so that the tubular nut may be screwed on to the tubular body by means of a spanner wrench. The tubular body has its inner corners beveled at 70 and at 71. These bevels are provided to accommodate sealing members 72 and 73 for effecting fluid-tight seals between the tubular body 65 and the shaft 60 when end rings 74 and 75 are secured to the ends of the tubular body 65. In the interior bore of the tubular body and preferably straddling the midpoint is formed a groove 76.

An annular ring 77 is mounted on the tubular body 65 and bears against the flange 66. A tubular member 78 fits on the tubular body 65 and members up against the ring 77. A second ring 79 which is preferably identical with the ring 77 is carried on the tubular body 65 and members up with the other end of the tubular member 78. The ring 77 and one end of the tubular member 78 are beveled off adjacent to the bores formed therein and conjointly compress a gasket 80 to effect a seal between the ring 77 and the tubular body. Likewise the passage end of the tubular member 78 and the ring 79 are beveled to accommodate a sealing gasket 81 for effecting a fluid-tight seal between the ring 79 and the tubular body 65.

Cutting into the outer surface of the tubular member 78 and centrally located therein, is an annular groove 82.

The above parts assembled in the manner described rotate with the shaft 60.

The stationary portion of the seal includes a tubular body 83 having a plurality of fins 84 formed integral therewith for radiating the heat generated by friction and thereby keeping the seal cool.

The tubular body 83 has a counterbore 85 formed in one end thereof and a like counterbore 86 formed in the other end thereof. It is also provided with a counterbore 87, the surface of which forms a working fit with the ring 88. The counterbore 87 forms a step with the counterbore 85. Stepped with the counterbore 86 is a counterbore 89 which forms a working fit with the ring 90. Since the rings 88 and 90 are of the same diameter, the surfaces of the counterbores 87 and 89 are identical in diameter and depth.

The portion 91 of the body 83 between the counterbores 87 and 89 has a plurality of holes 92 formed therein parallel to the center axis of the body.

Springs 93 are mounted in the holes 92 for urging the rings 88 and 90 respectively into contact with the inner faces of the rings 77 and 79.

The ring 88 is counterbored at 94 so that it presents a narrow face in contact with the ring 77; likewise, the ring 90 is counterbored in the same manner to present a narrow contact sealing face with the ring 79.

To effect a seal between the ring 88 and the surface of the counterbore 87 in the body 83, the ring has formed therein a triangular-like groove which carries a resilient sealing ring 95. A seal between the ring 90 and the surface of the counterbore 89 is effected in the same manner, the sealing ring 96 being carried in a triangular-like groove formed in the ring 90.

An annular member of U-shaped cross section, designated by the numeral 97, has its open face directed toward the outer face of the ring member 77 and is filled with a suitable wick or fibrous material to form a dust seal against the surface of the ring 77. The annular member 97 is of such diameter that it may be pressed into the counterbored portion 85 of the body 83. The counterbore 86 is provided with a like dust seal.

The tubular body 83 has a boss 98, and a hole 99 therein communicates with one of the spring holes 92. The outer end of the hole 99 is threaded to accommodate a fitting 100 which may be connected to a source of oil or other lubricant under pressure.

In addition to the counterbore 94 formed in the ring 88, the interior bore of the ring 88 is undercut as shown, thereby leaving a narrow face of the ring 88 in contact with the tubular member 78. The ring 90 is formed the same way. Oil under pressure entering via the hole 99 goes into the space in the top hole 92 about the spring 93. From this hole, the oil lubricates the portion of the body 91 where it bears upon the tubular member 78. Oil also passes between the surfaces of the rings in contact with the tubular member 78, passes into the undercut portion and thence into the counterbored portions 94, thereby furnishing a supply of oil for lubricating the contact surfaces between the ring 77 and the ring 88 on one end thereof and between the ring 79 and the ring 90 on the other end thereof.

The contact surfaces between the rings 88 and 90 and the tubular member 78 restrict the flow of oil and thereby prevent the counterbored cavities from becoming flooded with oil. However, I have found in practice that this arrangement provides ample lubrication for the contact surfaces between the moving rings (88, 90) and the stationary rings (77, 79). The tubular body 83 also has bosses 101 and 102 formed integral therewith. A hole 103 is drilled into the boss 101 and extends through the interior bore of the body so as to communicate with the annular groove 82. Likewise, a hole 104 is drilled into the boss 102 so as to communicate with the annular groove 82. Aligned holes 105 formed in the tubular body 65 and tubular member 78 are adapted to successively line up with the hole 103 and the hole 104 as the shaft rotates. Aligned holes 106 formed in the tubular body and tubular member diametrically opposite the holes 105, are also adapted to successively line up with the holes 103 and 104 as the shaft rotates.

The hole 103 is adapted to accommodate a suitable fitting 107 for leading air under pressure or any other fluid medium under pressure into the device. The fitting 107 may have a pipe or nipple 108 secured thereto or it may be made integral with the pipe or nipple 108, thereby forming both a conduit for leading the fluid into the seal and a stop for preventing the outside tubular body from rotating.

The outer end of the hole 104 is provided with threads to accommodate a suitable fitting 109 which may also be connected to the source of fluid under pressure. Cooperating with the pipe or nipple 108 are pins 110 and 111. These pins are spaced apart from each other so that the pipe 108 may extend between them, they are provided with heads on one end and are secured to the support 112 by means of cotter pins 113.

Assuming that air is the fluid medium under pressure used for controlling a member carried on the rotating shaft 60, the air pressure enters through the passage or hole 103 on one side and the passage 104 on the other side of the tubular body 83, thence it passes around the annular groove 82. It may then pass into the inner annular groove 76 and thence via the holes 62, 63 and 64 to the central hole 61 in the shaft 60. As the shaft 60 rotates, the passage of the air to the center hole 61 is facilitated due to the fact that in one position the air may pass directly from the hole 104 via the hole 106 and the hole 64 to the hole 61. At that instant, the air from the other hole 103 passes via the hole 105 into the annular groove 76 and thence via the holes 62 and 63 to the center hole 61. Now when the shaft makes a half revolution, a hole 64 is lined up with the hole 103 instead of the hole 104, therefore the air is fed directly to the hole 61 via the holes 103, 106 and 64 to the hole 61.

At intermediate points of the revolution of the shaft, the annular groove 82 is of ample size to carry the desired volume of air and it is augmented by the annular groove 76.

In all of the embodiments herein shown and described, the parts comprising the opposite sides of the sealing device are identical. This makes it possible to manufacture such devices at a much lower cost.

Although I have described several preferred embodiments of the new and improved seal, it must be understood that these are merely given by way of example, and should not be limitative, except in so far as set forth in the following claims.

What is claimed is:

1. In a rotary shaft seal for a shaft having a longitudinal passage therein and a radial passage communicating therewith, the combination with a rotor comprised of a central member having identical right and left annular rings carrying inwardly disposed sealing surfaces, means securing said central member and said ring members together spanning said radial passage and in sealed relation to said shaft, a stator bearing on said rotor and including an annular body having associated therewith identical annular members having sealing faces engaging and effecting a running seal with the sealing surfaces of said rotor, an annular web carried by said annular body and lying between said annular members, means engaging said annular web and said annular members to prevent circumferential movement of said members, spring means embracing said last means for forcing said annular members into engagement with said annular rings, means for lubricating the bearing surfaces and said sealing faces, means forming other passages through said seal, and means for securing a fitting to said stator in communication with said last mentioned passages for supplying a fluid medium under pressure to said first mentioned passages.

2. In a rotary shaft seal for a shaft having a longitudinal passage therein, and a radial passage communicating therewith, the combination with a rotor comprised of a central member having identical right and left annular rings carrying inwardly disposed sealing surfaces, means securing said central member and said ring members together spanning said radial passage and in sealed relation to said shaft, a stator bearing on said rotor, and comprised of a central body carrying identical axially movable right and left ring shaped members spaced apart from each other, and having an annular web of said central body positioned therebetween, said ring shaped members having annular sealing faces, a plurality of depressions formed in said ring shaped members in the annular faces opposite said sealing faces, fluid-tight seals between said last central body and said ring shaped members, a plurality of axial holes formed in said annular web, distance rods positioned in said holes and engaging the depressions in said ring shaped members, thereby preventing the latter from moving independently of said central body, spring means engaging said ring members and urging them in opposite directions axially for effecting a running seal between the sealing surfaces of said rotor and the sealing faces of said stator, means for lubricating the bearing surfaces in said shaft seal, means forming passages through said seal, and a threaded hole in said stator communicating with said last mentioned passages whereby a fitting may be secured to said stator for supplying a fluid medium under pressure to said first mentioned passages.

3. In a rotary shaft seal for a shaft having a longitudinal passage therein and a radial passage communicating therewith, the combination with a tubular body adapted to be mounted on said shaft, an annular groove formed within said body and adapted to be placed in communication with said radial passage when said body is mounted on said shaft, a second annular groove formed on said body in line with said first annular groove, a hole formed in said body communicating with both said grooves, a pair of ring members substantially larger in diameter than said tubular body and positioned at each end of said body, said ring member having inwardly disposed sealing faces facing each other, means to secure said ring members to said tubular body, means for effecting a fluid-tight seal between said ring members and said shaft, a tubular stator having an interior bore forming a working fit on said tubular body and having an annular recess formed in each end thereof, a pair of sealing rings carried in said recesses, a plurality of axially extending spacer members extending through said stator and engaging said rings, spring means urging said sealing rings in opposite directions to maintain their sealing faces in contact with said first sealing faces, means for maintaining fluid tight seals between said sealing rings and said stator, dust-seals positioned between said stator and said ring members, an oil passage in said stator for leading oil to said sealing rings, and a passage for leading a fluid medium under pressure to said second groove and via the hole in said body to said first groove and thence to the passages in said shaft.

4. A rotary shaft seal according to claim 3 in which a plurality of longitudinal holes are formed in said stator parallel to the axis thereof and communicating with said annular recesses for containing said spring means in which said sealing rings each have a series of depressions formed in their annular faces opposite to their sealing faces, and in which the spacer members are spacing pins extending through said holes and engaging the depressions in said sealing rings.

5. In a rotary shaft seal for a shaft having a longitudinal passage therein and a radial passage communicating therewith, the combination with a tubular body having a flange at one end and a second flange at the other end thereof, means for effecting a fluid tight seal between said tubular body and said shaft, a tubular member mounted on said tubular body, annular rings carried on said tubular body at each end of said annular member and having inwardly disposed sealing faces, a tubular stator having an interior bore forming a working fit on said tubular body and having annular recesses formed in each side thereof, a pair of sealing rings carried by said stator in said recesses in substantially fixed relation thereto circumferentially and having sealing faces cooperating with the sealing faces on said annular rings, spring means acting against said sealing rings to maintain their sealing faces in contact with the sealing faces on said annular rings, means for maintaining seals between said sealing rings and said stator, clearance spaces formed in each end of said stator adjacent to the circumferential faces of said annular rings, dust seals mounted in said clearance spaces and bearing on said circumferential faces, an oil passage in said stator for leading oil to the relatively moving parts in said seal, an external annular groove formed on said tubular member, an internal annular groove formed in said tubular body in communication with said first groove, and a passage in said stator for leading a fluid medium under pressure to said first groove and thence to the passages in said shaft.

LINDSAY H. BROWNE.